(12) United States Patent
Tsai et al.

(10) Patent No.: US 7,172,842 B2
(45) Date of Patent: Feb. 6, 2007

(54) COLOR FILTER ARRAY PLATE AND METHOD OF FABRICATING THE SAME

(75) Inventors: Ming-Feng Tsai, Tainan (TW); Yu-Cheng Lo, Taipei (TW); Huai-An Li, Taoyuan (TW)

(73) Assignee: Chunghwa Picture Tubes, Ltd., Taipei (TW)

( * ) Notice: Subject to any disclaimer, the term of this patent is extended or adjusted under 35 U.S.C. 154(b) by 496 days.

(21) Appl. No.: 10/844,712

(22) Filed: May 12, 2004

(65) Prior Publication Data

US 2005/0255392 A1  Nov. 17, 2005

(51) Int. Cl.
G02B 5/20 (2006.01)

(52) U.S. Cl. .................. 430/7; 347/106; 430/945

(58) Field of Classification Search .................. None
See application file for complete search history.

(56) References Cited

U.S. PATENT DOCUMENTS 6,468,702 B1 * 10/2002 Yi et al. .................. 430/7

FOREIGN PATENT DOCUMENTS

JP 4-123006 * 4/1992
JP 8-292313 A * 11/1996

* cited by examiner

Primary Examiner—John A. McPherson
(74) Attorney, Agent, or Firm—J.C. Patents

(57) ABSTRACT

A method of manufacturing a color filter array plate is described. A substrate is first provided, and a black matrix is formed on the substrate to define several sub-pixel areas. A hydrophobic layer is then pasted on the black matrix, wherein the hydrophobic layer is made of materials including an ester compound having a chemical formula of:

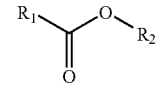

Then, an ink-jet printing process is performed where at least one type of color ink is injected into the sub-pixel areas between patterns of the black matrix. A thermal baking process is subsequently carried out to solidify the color ink for forming color film patterns.

14 Claims, 3 Drawing Sheets

COLOR FILTER ARRAY PLATE AND METHOD OF FABRICATING THE SAME

BACKGROUND OF THE INVENTION

1. Field of the Invention

The present invention relates to a color filter array plate and manufacturing method thereof, and more particularly relates to a color filter array plate wherein a hydrophobic layer is formed on the surface of a black matrix, and a method of manufacturing the color filter array plate.

2. Description of the Related Art

A conventional liquid crystal display (LCD) consists mainly of a thin film transistor array (TFT) plate, a color filter array plate, and a liquid crystal layer sandwiched between two transparent plates. The thin film transistor array plate includes mainly thin film transistors, scanning lines, data lines and pixel electrodes, while the color filter array plate includes mainly a black matrix and a color filter film. Wherein, the black matrix is used as a light-shielding layer and should have good light-shielding property and low reflectivity. The color filter array plate is used in optical devices for receiving/displaying color images. Each pixel of such optical devices is corresponding to filter films of three colors (red, green and blue), so as to display a full color image.

A method for forming a color filter film via an ink-jet printing process has been developed recently. This method includes firstly forming a black matrix on a substrate to define a plurality of sub-pixel areas. An ink-jet printing process is then performed to inject color ink (red, green, and/or blue) into the sub-pixel areas between patterns of the black matrix. Next, a thermal baking process is carried out to solidify the color ink for forming color film patterns.

The above conventional method for forming color filter films via an ink-jet printing process has some shortcomings, such as, during the ink-jet printing process to inject color ink into the sub-pixel areas between patterns of the black matrix, the level of color ink in each of sub-pixel areas is often higher than the surface of the black matrix since the volume of the color ink injected is usually a little larger than that defined by the sub-pixel areas. The intermixing between these color ink may occur if ink-jet printing process is not suitably controlled.

SUMMARY OF THE INVENTION

Accordingly, the present invention is to provide a color filter array plate where overflow of color ink is unlikely to occur during the process of injecting color ink into each sub-pixel area, and thus the problem of intermixing can be avoided.

The present invention is also to provide a method of manufacturing a color filter array plate, wherein, ester compounds are used as hydrophobic layers to achieve water guarding effect, so that color ink overflow will not occur when the color ink is injected into each of the sub-pixel areas, and color intermixing between sub-pixels can be avoided.

This invention provides a color filter array plate, which includes a substrate, a black matrix, a hydrophobic layer, and a plurality of color filter film patterns. Wherein, the black matrix is disposed on the substrate to define a plurality of sub-pixel areas, the hydrophobic layer is pasted over the surface of the black matrix, and the color filter film patterns are formed in the sub-pixel areas between patterns of the black matrix. The hydrophobic layer is made of materials, including an ester compound of the following chemical formula:

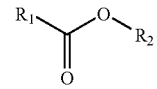

Where, $R_1$ represents an alkyl group of 1~2 carbons, and $R_2$ represents an alkyl group of 5~8 carbons.

This invention also provides a method for manufacturing a color filter array plate. Wherein, a black matrix is formed on a substrate to define a plurality of sub-pixel areas, and a hydrophobic layer is pasted on the black matrix. While the hydrophobic layer is made of materials, including an ester compound of the following chemical formula:

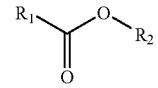

Where, $R_1$ represents an alkyl group of 1~2 carbons, and $R_2$ represents an alkyl group of 5~8 carbons. A process of ink-jet printing is then performed to inject at least one type of color ink into the sub-pixel areas between patterns of the black matrix. Next, a thermal baking step is performed to solidify the color ink and to form a plurality of color filter film patterns.

In this invention, an ester compounds are used as hydrophobic layers to achieve water-guarding effect, so that, in the process of making the color filter film via injecting, the color ink injected into a sub-pixel area is less likely to overflow to other sub-pixel areas to cause color intermixing problem.

It is to be understood that both the foregoing general description and the following detailed description are exemplary, and are intended to provide further explanation of the invention as claimed.

DESCRIPTION OF THE PREFERRED EMBODIMENTS

Figure 1A:
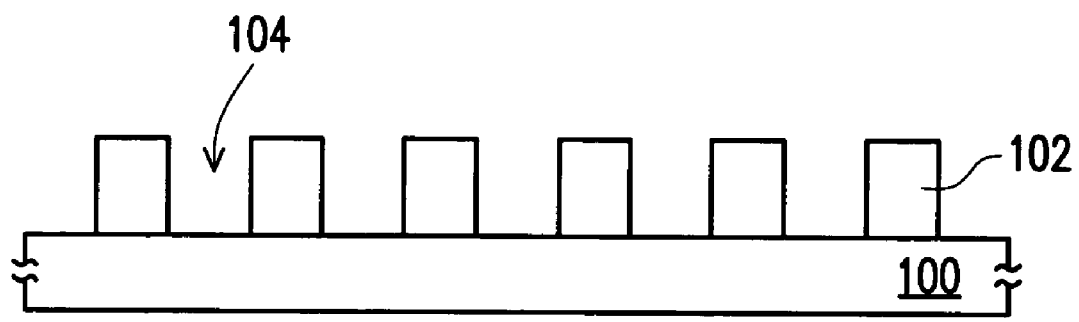
FIGS. 1A to 1D are cross-sectional views illustrating a process of manufacturing a color filter array plate according to a preferred embodiment of the present invention.
Figure 1B:
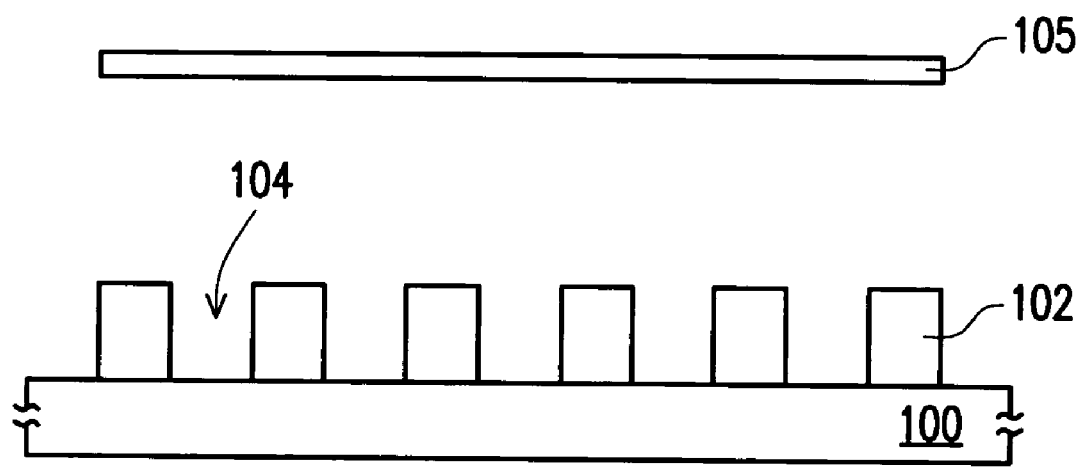

Reference will now be made in detail to the preferred embodiments of the invention, examples of which are illustrated in the accompanying drawings. Wherever possible, the same or similar reference numbers are used in the drawings and the description to refer the same or like parts. The drawings are in schematic form, and are not scaled ones.

FIGS. 1A to 1D illustrate a process of manufacturing a color filter array plate according to a preferred embodiment of the present invention.

This invention provides a method of manufacturing a color filter array plate. Referring to FIG. 1A, a substrate 100 is first provided, wherein, the substrate 100 is, for example, a glass substrate having high transmittance. A black matrix 102 is then formed on the substrate 100 to define a plurality of sub-pixel areas 104, wherein, the black matrix 102 is made of a material of, for example, resin, metal, or other materials with good light-shielding property and low reflectivity. According to a preferred embodiment, the method for forming the black matrix 102 includes forming a resin layer (not shown) having photo-sensitivity on the transparent substrate 100. The process for forming the resin layer is, for example, coating a black non-transparent resin via a spin-on method on the transparent substrate 110 in such a thickness that the resin layer has good light-shielding property and low reflectivity. Next, a photolithographic process is performed on the resin layer to form the black matrix 102.

The function of the black matrix 102 is mainly to effectively separate different colors of the emitted light so as to increase the purity of colors displayed. While the sub-pixel areas 104 are defined as areas for receiving the injected color ink of different colors (e.g., red ink, green ink, and blue ink).

Figure 1C:
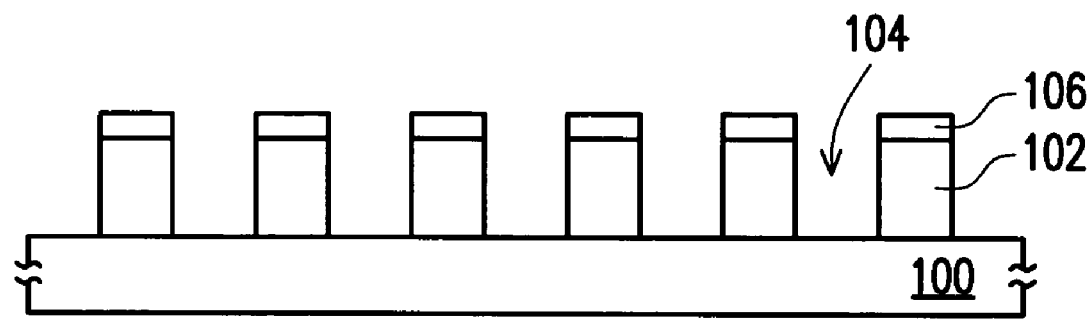

Next, referring to FIG. 1C, a hydrophobic layer 106 is pasted over the black matrix 102. The hydrophobic layer 106 is made of materials including an ester compound of the following chemical formula:

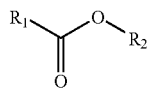

where, $R_1$ represents an alkyl group of 1~2 carbons, and $R_2$ represents an alkyl group of 5~8 carbons. In a preferred embodiment, the hydrophobic layer 106 further includes a surfactant, such as silicon surfactant.

In a preferred embodiment, the method of pasting the hydrophobic layer 106 on the black matrix 102 includes, for example, pasting a hydrophobic material film 105 (shown in FIG. 1B) directly over the black matrix 102, so as to form the hydrophobic layer 106 at least on the upper surface of the black matrix 102, as shown in FIG. 1C.

Figure 2:
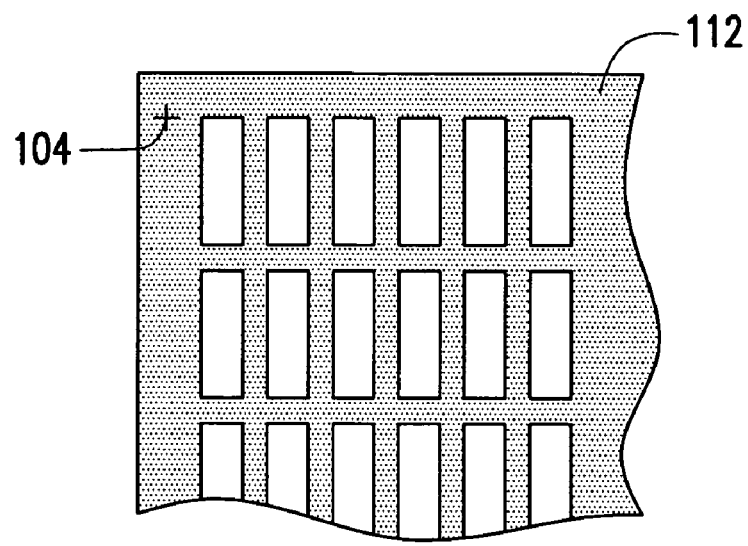
FIG. 2 is a schematic view showing a patterned film of hydrophobic material.
Figure 3:
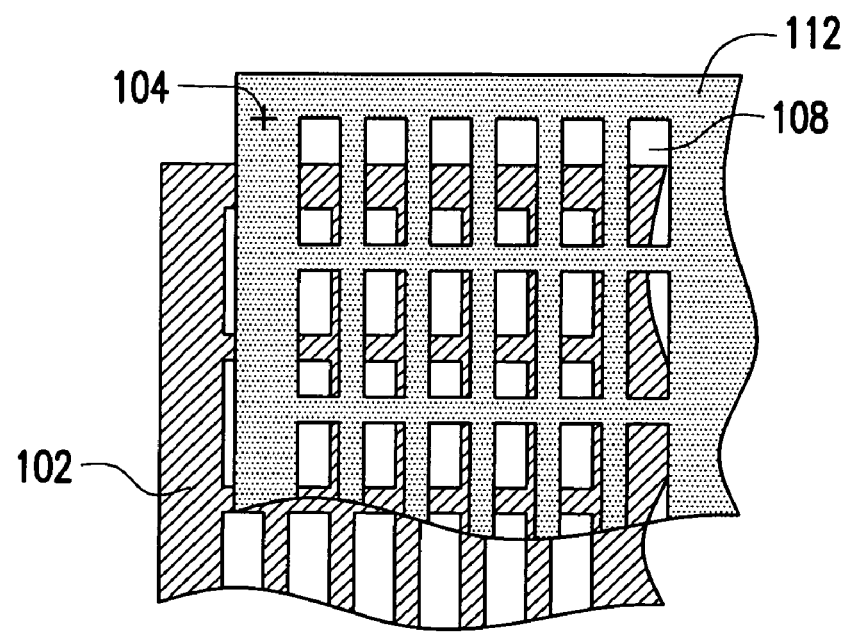
FIG. 3 is a schematic view showing alignment of a patterned film of hydrophobic material and a substrate using an alignment mark.

According to another preferred embodiment, the method for pasting the hydrophobic layer 106 over the black matrix 102 is shown in FIGS. 2 and 3. For example, a patterned hydrophobic material film 112, as shown in FIG. 2, is first provided, wherein, the patterned hydrophobic material film 112 has a pattern identical to that of the black matrix 102. Particularly, the method of forming the patterned hydrophobic material film 112 is, for example, cutting a hydrophobic material film via laser or mechanical cutting. Next, as shown in FIG. 3, the patterned hydrophobic material film 112 is pasted over the surface of the black matrix 102. In a preferred embodiment, the patterned hydrophobic material film 112 further includes an alignment mark 114 defined thereon, such that, in the process of pasting the patterned hydrophobic material film 112 over the surface of the black matrix 102, the alignment mark 114 can be used to align the patterned hydrophobic material film 112 with the substrate 100, and therefore the patterned hydrophobic material film 112 can be accurately pasted on the surface of the black matrix 102.

Figure 1D:
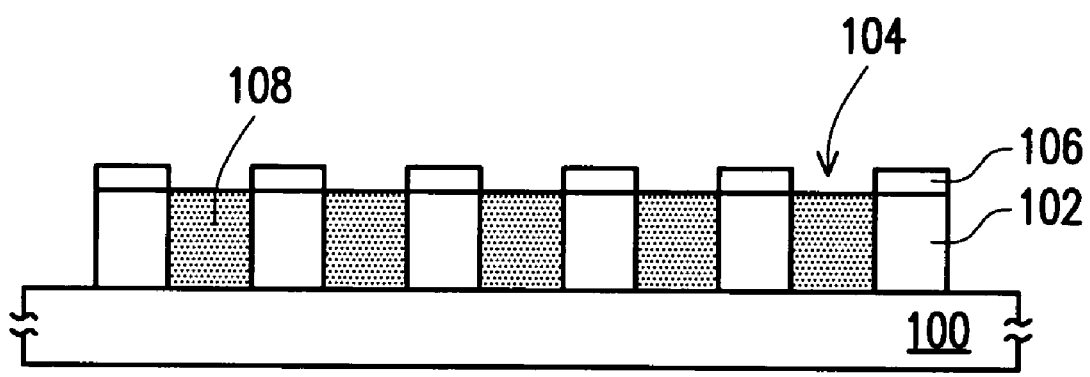

Referring further to FIG. 1D, after the hydrophobic material film 106 or the patterned hydrophobic material film 112 is pasted on the surface of the black matrix 102, a process of ink-jet printing is carried out to inject at least one type of color ink into the sub-pixel areas 104 between the patterned portions of the black matrix 102. In a preferred embodiment, the color ink injected into the sub-pixel areas includes red, green and blue ink.

Next, a thermal baking process is carried out to solidify the foregoing color ink and thus to form a plurality of color filter film patterns 108. The color film patterns 108 include a plurality of red filter film patterns, a plurality of green filter film patterns, and a plurality of blue filter film patterns.

From the foregoing preferred embodiments, it is known that the hydrophobic layer is pasted on the surface of the black matrix to achieve water-guarding effect, such that, in the process of making the color filter film via injecting, the color ink injected into a sub-pixel area is less likely to overflow to other sub-pixel areas to cause pollution. Moreover, the method of this invention for pasting the hydrophobic layer on the surface of the black matrix can be performed via a simple direct pasting process, or via a pasting process after patterning through laser or mechanical cutting, wherein no additional masks are required and thus the process can be simplified.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

What is claimed is:

1. A color filter array plate, comprising:
    a substrate;
    a black matrix disposed on the substrate to define a plurality of sub-pixel areas on the substrate;
    a hydrophobic layer pasted on a surface of the black matrix; and
    a plurality of color filter film patterns disposed in the sub-pixel areas between patterns of the black matrix,
    wherein, the hydrophobic layer is made of materials comprising an ester compound having the following chemical formula:

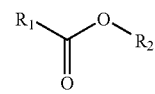

where, $R_1$ represents an alkyl group of 1~2 carbons, and $R_2$ represents an alkyl group of 5~8 carbons.

2. The color filter array plate as recited in claim 1, wherein the hydrophobic layer further comprises a surfactant.

3. The color filter array plate as recited in claim 2, wherein the surfactant is a silicon surfactant.

4. The color filter array plate as recited in claim 1, wherein the hydrophobic layer is pasted on an upper surface of the black matrix.

5. The color filter array plate as recited in claim 1, wherein the color filter film patterns comprise a plurality of red filter film patterns, a plurality of green filter film patterns, and a plurality of blue filter film patterns.

6. A method of manufacturing a color filter array plate, comprising:
    forming a black matrix on a substrate to define a plurality of sub-pixel areas;
    pasting a hydrophobic layer on the black matrix, wherein the hydrophobic layer is made of materials including an ester compound having the following chemical formula:

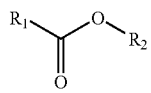

where, $R_1$ represents an alkyl group of 1~2 carbons, and $R_2$ represents an alkyl group of 5~8 carbons;

performing a ink-jet printing process to inject at least one type of color ink into the sub-pixel areas between patterns of the black matrix; and performing a thermal baking step to solidify the color ink and form a plurality of color filter film patterns.

7. The method of manufacturing a color filter array plate as recited in claim 6, wherein the step of pasting the hydrophobic layer on the black matrix comprises pasting a hydrophobic material film directly over the black matrix so as to form the hydrophobic layer on a surface of the black matrix.

8. The method of manufacturing a color filter array plate as recited in claim 6, wherein the step of pasting the hydrophobic layer on the black matrix comprises:

providing a hydrophobic material film;

patternizing the hydrophobic material film so that the hydrophobic layer and the black matrix have identical patterns; and pasting the patterned hydrophobic material film on an upper surface of the black matrix.

9. The method of manufacturing a color filter array plate as recited in claim 8, wherein the step of patternizing the hydrophobic material film comprises laser cutting.

10. The method of manufacturing a color filter array plate as recited in claim 8, wherein the step of patternizing the hydrophobic material film comprises mechanical cutting.

11. The method of manufacturing a color filter array plate as recited in claim 8, wherein an alignment mark is designed on the patterned hydrophobic material film, and, before the step of pasting the patterned hydrophobic material film, the method further comprises aligning the patterned hydrophobic material film with the substrate using the alignment mark.

12. The method of manufacturing a color filter array plate as recited in claim 6, wherein the hydrophobic layer further comprises a surfactant.

13. The method of manufacturing a color filter array plate as recited in claim 12, wherein the surfactant includes silicon surfactant.

14. The method of manufacturing a color filter array plate as recited in claim 6, wherein the ink injected into the sub-pixel areas comprises red ink, green ink, and blue ink.

* * * * *